United States Patent
Wu et al.

(10) Patent No.: US 7,242,692 B2
(45) Date of Patent: Jul. 10, 2007

(54) METHOD AND DEVICE FOR COORDINATING PACKET TRANSMISSION ORDER

(75) Inventors: Cheng-Yuan Wu, Taipei (TW); Stone Wei, Taipei (TW); Chih Hsien Weng, Taipei (TW)

(73) Assignee: VIA Technologies, Inc., Taipei (TW)

( * ) Notice: Subject to any disclaimer, the term of this patent is extended or adjusted under 35 U.S.C. 154(b) by 1044 days.

(21) Appl. No.: 10/207,581

(22) Filed: Jul. 29, 2002

(65) Prior Publication Data

US 2003/0086431 A1     May 8, 2003

(30) Foreign Application Priority Data

Nov. 7, 2001    (TW)  .............................. 90127701 U

(51) Int. Cl.
*H04L 12/28*     (2006.01)
(52) U.S. Cl. ............... 370/414; 370/230.1; 370/395.42
(58) Field of Classification Search ........... 370/395.42, 370/414, 230.1
See application file for complete search history.

(56) References Cited

U.S. PATENT DOCUMENTS 6,128,278 A * 10/2000 Joffe et al. .................. 370/229
6,389,019 B1 * 5/2002 Fan et al. .............. 370/395.42
6,744,776 B1 * 6/2004 Kalkunte et al. ........... 370/412

* cited by examiner

*Primary Examiner*—Huy D. Vu
*Assistant Examiner*—Jason Mattis
(74) *Attorney, Agent, or Firm*—Volpe & Koenig PC

(57) ABSTRACT

A method for coordinating packet transmission order for a plurality of registers of different priority levels is disclosed. Packets are transmitted from the registers according to the priority levels in a normal condition. A count value is generated in response to the transmitted packets. A particular priority level of one of the registers, from which a packet is being transmitted out, is recorded when the count value is larger than a predetermined threshold. Then the normal condition switches into a cleaning condition, and one packet is transmitted from each of the registers which are not empty and have priority levels lower than the particular priority level according to priority. Finally, reset the count value, and return to the normal condition. A device for coordinating packet transmission order for a plurality of registers of different priority levels is also disclosed.

11 Claims, 3 Drawing Sheets

METHOD AND DEVICE FOR COORDINATING PACKET TRANSMISSION ORDER

FIELD OF THE INVENTION

The present invention relates to a packet transmission order-coordinating method, and more particularly to a method for coordinating the transmission order of packets in a plurality of registers of different priority levels. The present invention also relates to a device for coordinating packet transmission order from registers of different priority levels.

BACKGROUND OF THE INVENTION

In current network application, generally, a packet is a basic unit for transmission. For determining the priority of a number of packets in network transmission, packets are imparted with respective priority levels according to a network transmission protocol. For example, an image or a voice packet is generally classified as a high priority-level packet because of its delay-sensitive feature. Furthermore, for transmitting the packets according to respective priority levels, a plurality of queues corresponding to the different priority levels are implemented in the network design for arranging and transmitting the packets.

FIG. 1 is a diagram illustrating a conventional queue hardware structure with priority level differentiation. As shown in FIG. 1, the first queue 11 is provided for storing the packets of a relatively high priority level and the second queue 12 is provided for storing the packets of a relatively low priority level. Typically, the packets of a lower priority level in the second queue 12 will not be transmitted until all packets of a higher priority level in the first queue 11 are transmitted and cleaned out. Therefore, the packet transmission of the first queue 11 usually occupies most of the bandwidth of the transmission channel 10 so that the packets in the second queue 12 cannot be transmitted out and errors are likely to occur in upper layer applications.

Therefore, the purpose of the present invention is to develop a packet transmission order-coordinating method and device to deal with the above situations encountered in the prior art.

SUMMARY OF THE INVENTION

An object of the present invention is to provide a method and a device for coordinating packet transmission order for arranging a specific interpolation pattern to transmit packets.

Another object of the present invention is to provide a method and a device for coordinating packet transmission order for preventing the packets of the lower priority levels from transmission jam.

According to an aspect of the present invention, there is provided a method for coordinating packet transmission order for a plurality of registers of different priority levels. Packets are transmitted from the registers according to the priority levels in a normal condition. A count value is generated in response to the transmitted packets. A particular priority level of one of the registers, from which a packet is being transmitted out, is recorded when the count value is larger than a preset threshold. Then the normal condition switches into a cleaning condition, and one packet is transmitted from each of the registers which are not empty and have priority levels lower than the particular priority level according to priority. Afterwards, the count value is zeroed, and the system returns to the normal condition.

Preferably, the registers are a plurality of queues.

Preferably, the output ends of the queues are enabled in the normal condition.

Preferably, the output ends of the queues are disabled after transmitting out respective packets in the cleaning condition.

According to another aspect of the present invention, there is provided a method for coordinating a packet transmission order for a plurality of registers of different priority levels. The method includes the steps of transmitting out packets from the registers according to the priority levels in a normal condition, recording a particular priority level of the last packet transmitted before the normal condition changes to a cleaning condition, and transmitting out at least one packet from the registers having priority levels lower than the particular priority level in the cleaning condition.

Preferably, the method includes a step of counting an accumulated number of packets transmitted from the registers in the normal condition. The normal condition changes to the cleaning condition when the accumulated number exceeds a threshold.

For example, in the cleaning condition, the transmission of packets of the particular priority level is interrupted, and each of the registers having priority levels lower than the particular priority level transmits one packet, and the transmitting register is then disabled. The cleaning condition changes to the normal condition after all of the registers having priority levels lower than the particular priority level are disabled.

According to an additional aspect of the present invention, there is provided a device for coordinating a packet transmission order for a plurality of registers of different priority levels. The device includes a counter and a controller. The counter is electrically connected to the registers, and generates a count value corresponding to a number of packets transmitted from the registers. The controller is electrically connected to the counter and the registers. A particular priority level of one of the registers, from which a packet is being transmitted out in a normal condition, is recorded under the control of the controller. Further, the normal condition switches into a cleaning condition when the count value is larger than a preset threshold. In the cleaning condition, one packet is transmitted from each of the registers which are not empty and have priority levels lower than the particular priority level according to priority. Then, the controller has the count value zeroed, and returns to the normal condition.

The present device is especially suitable for coordinating the packet transmission order for the registers of a queue type.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
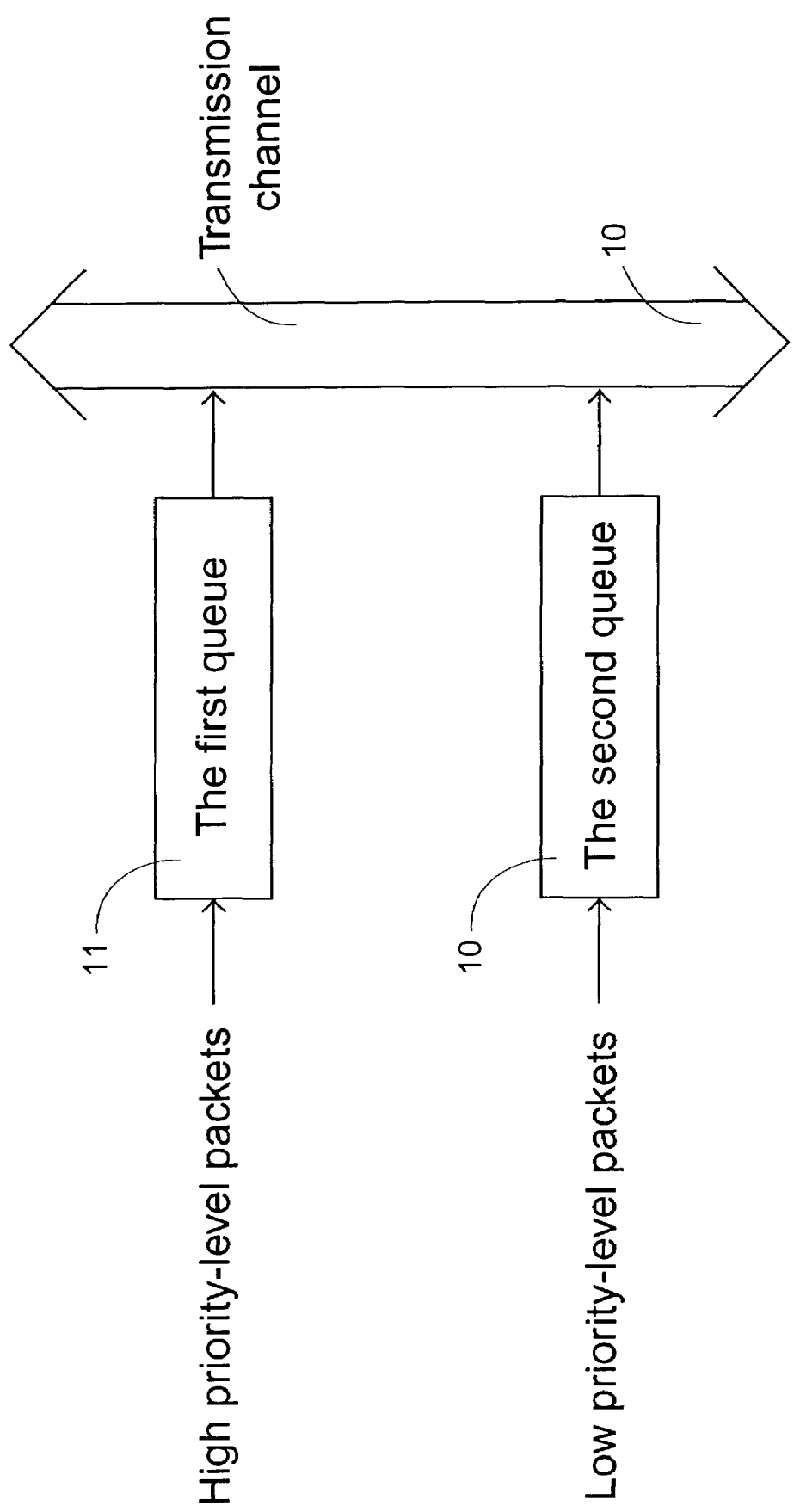
FIG. 1 is a diagram illustrating a conventional queue hardware structure with priority level differentiation.
Figure 2:
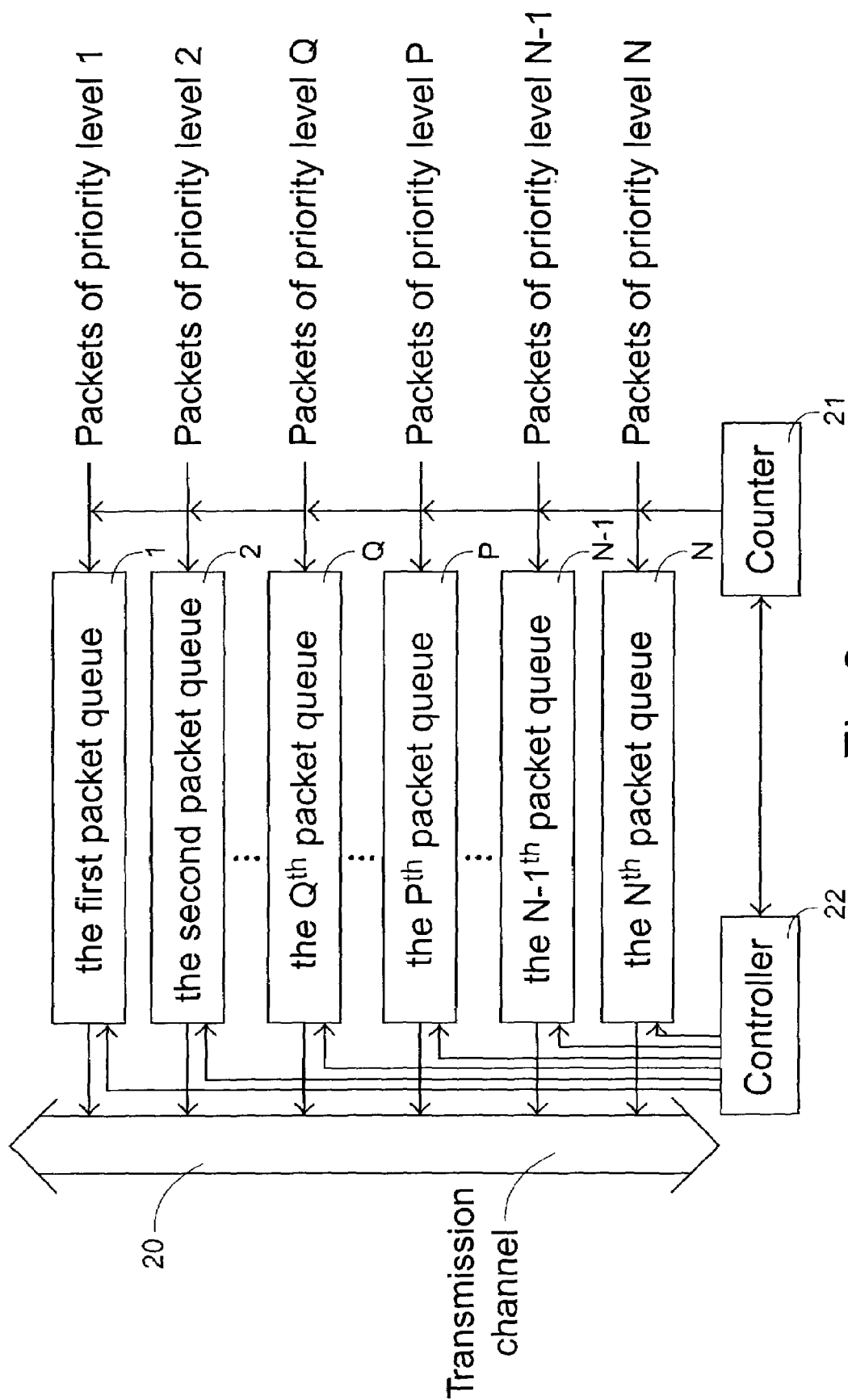
FIG. 2 is a diagram illustrating a preferred embodiment of a hardware structure according to the present invention.

Please refer to FIG. 2 which is a diagram illustrating a preferred embodiment of hardware structure for a packet transmission order-coordinating device according to the present invention. As show in FIG. 2, the hardware structure for packet transmission according to different priority comprises N packet queues which include the $N^{th}$ packet queue of a priority level N, the $N-1^{th}$ packet queue of a priority level N−1, . . . , the $P^{th}$ packet queue of a priority level P, . . . , the $Q^{th}$ packet queue of a priority level Q, . . . , the second packet queue of a priority level 2 and the first packet queue of the priority level 1. It is to be noted that a higher numeral of the priority level indicates a higher priority level. In other words, the packets in the $N^{th}$ packet queue of the priority level N are the ones to be transmitted first. Those packet queues are used to respectively receive and buffer the packets which bear corresponding priority levels, and further transmit the packets to a transmission channel 20 according to an order specified by an order-coordinating mechanism. For balancing the transmission efficiency with the transmission priority, a counter 21 and a controller 22 are included in a packet transmission order-coordinating device according to the present invention. The counter 21 is electrically connected to each of the packet queues 1~N. When the packets stored in the packet queues 1~N are transmitted out in a normal condition, it means that the packets would be transmitted according to their imparted priority levels. Meanwhile, a count value corresponding to a number of packets transmitted from the packet queues will be obtained by the counter 21. The controller 22 is electrically connected to the counter 21 and each of the packet queues 1~N. When the count value is larger than a preset threshold, a particular priority level of a packet which is being transmitted will be recorded, and the normal condition is switched to a cleaning condition. In the cleaning condition, a specific interpolation transmission pattern is performed to alleviate the transmission jam. It is desired to have the transmission of the packets of the particular priority level interrupted, and allows the packet queues which have priority levels lower than the recorded particular priority level to be enabled for packet transmission. In this embodiment, each designated low-priority-level queue is enabled once to transmit out one packet, if any, according to priority, and then be disabled by the controller 22. When all the designated queues of low priority levels are disabled, the count value of the counter 21 is zeroed, and the output ends of the packet queues return to the normal condition.

Figure 3:
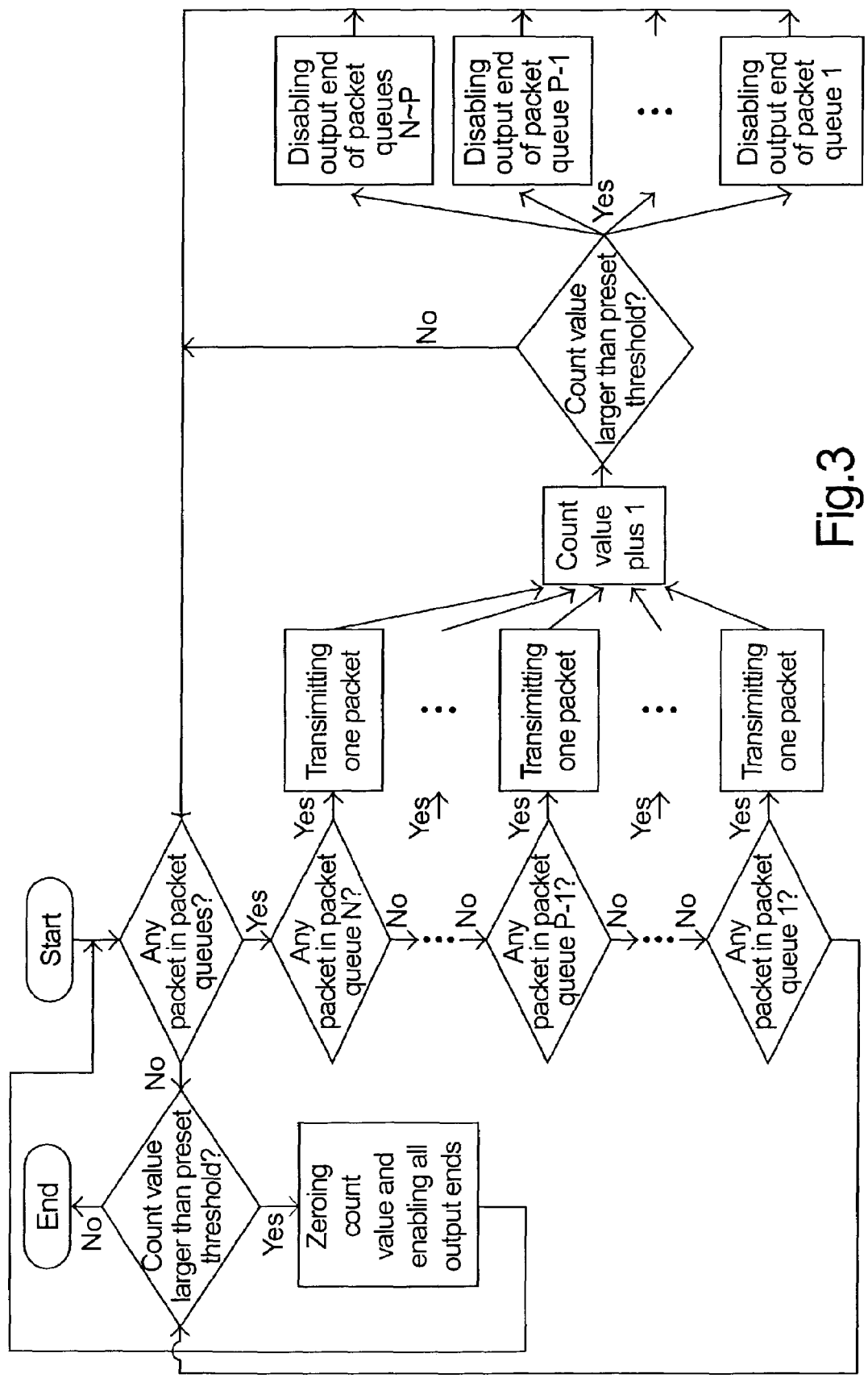
FIG. 3 is a brief flow chart illustrating a preferred embodiment of a method for coordinating a packet transmission order according to the present invention.

FIG. 3 is a flow chart illustrating a preferred embodiment of a method for coordinating a packet transmission order according to the present invention. In a normal condition, the output ends of packet queues are kept in an enabled state. Subsequently, the controller 22 enters a procedure to determine whether there is any packet in the packet queues to be transmitted or not. If there are packets in the packet queues to be transmitted, then the packets are transmitted according to their priority levels. That is, the transmission starts form the highest priority level to the lowest one. During the packet transmission in the normal condition, the counter 21 counts the accumulated number of the transmitted packets to generate a count value. Once the count value is larger than a preset threshold, the particular priority level of packet which is being transmitted is recorded and the normal condition will be switched to a cleaning condition by the controller 22. In the cleaning condition, for the packet queues which are not empty and have the priority levels lower than the recorded particular priority level, one packet is transmitted from each such packet queue according to priority. Afterwards, the count value is reset and restarted and the transmission condition is returned to the normal condition. Although the present method permits one cycle only to transmit packets of lower priority levels in the clean condition, it is understood that more than one consecutive cycle or another interpolation pattern to transmit packets of lower priority levels, if required, can also be performed according to the present invention.

Hereinafter, an example is given to further describe the device of FIG. 2 with reference to FIG. 3 so as to facilitate the understanding of the invention. Assume that after a packet is transmitted from the $P^{th}$ packet queue P to the transmission channel 20, the count value generated form the counter 21 is just larger than the preset threshold. Thus, the particular priority level of the packet recorded by the controller 22 is "P". The output ends of the packet queue P and those queues P+1, P+2, . . . , N of the higher priority levels are disabled when the normal condition changes to the cleaning condition. The disabled packet queue is considered as that there is no packet therein. Thus, the packet queues N~P will not transmit any other packet out temporarily. According to priority, it is now the time for the packet queue P−1 to transmit out one packet, if any. Meanwhile, the count value is further increased and still larger than the preset threshold. Subsequently, the packet queues P−2, P−3, . . . , Q, Q−1, . . . , 2, 1 transmit one packet out in turn, and then the output ends of the packet queues are disabled one by one. After all the associated queues of lower priority are disabled in the cleaning condition, the counter is zeroed and the system returns to the normal condition. All the output ends of packet queues are in an enabled state again.

For another example, at the beginning, when the system is under normal condition, the packets are transmitted out in order from the packet queues according to their priority levels. The counter 21 will count the number of the transmitted packets to obtain the count value. When the count value larger than the preset threshold is due to the last packet transmission from the $Q^{th}$ packet queue Q, which is smaller than the above P, the controller 22 will record the particular priority level as "Q". Subsequently, the system enters the cleaning condition. Once the cleaning condition is activated, the output ends of the packet queues N, N−1, . . . , P . . . , Q are disabled, so those queues are considered to be empty, and the next packet to be transmitted is the one from the packet queue Q−1 if there is any packet in the packet queue Q−1 enqueued for transmission. After transmitting out the packet, the output end of the packet queue Q−1 is disabled. Likewise, the packets from the packet queues Q−2, Q−3, . . . , 2, 1 are transmitted one by one according to priority as long as the packet queues are not empty. After the cleaning transmission mode is complete, the count value is still larger than the preset threshold, so the count value is zeroed and all the output ends of the packet queues are back to the normal condition. That is, they are enabled again. Therefore, the system will start another alternate normal and cleaning cycles. Once the count value is larger than the preset threshold, the cleaning condition described as above is executed.

To sum up, the method for coordinating packet transmission order for registers of different priority levels according to the present invention can efficiently coordinate the transmission timing for the packets having lower priority levels by selecting a proper preset threshold. Further, the present invention can solve the problems that the packets of the lower priority levels keep standby and cannot be transmitted so as to cause the transmission jam. Therefore, some errors occurring in upper layer applications can be avoided.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for coordinating packet transmission order for a plurality of registers of different priority levels, comprising the steps of:

transmitting out packets from said registers according to said priority levels in a normal condition and generating a count value in response to the transmitted packets;

recording a particular priority level of one of said registers, from which a packet is being transmitted out, when said count value is larger than a preset threshold, and switching said normal condition into a cleaning condition;

transmitting out one packet from and then disabling each of said registers which are not empty and have priority levels lower than said particular priority level according to priority in said cleaning condition; and returning to said normal condition after all of said registers having priority levels lower than said particular priority level are disabled.

2. The method according to claim 1 wherein said registers are a plurality of queues.

3. The method according to claim 2 wherein output ends of said queues are enabled in said normal condition.

4. The method according to claim 2 wherein output ends of said queues are disabled after transmitting out respective packets in said cleaning condition.

5. A method for coordinating packet transmission order for a plurality of registers of different priority levels, comprising the steps of:

transmitting out packets from said registers according to said priority levels in a normal condition;

recording a particular priority level of the last packet transmitted before said normal condition chances to a cleaning condition; and transmitting out at least one packet from said registers having priority levels lower than said particular priority level in said cleaning condition;

wherein in said cleaning condition, the transmission of packets of said particular priority level is interrupted, each of said registers having priority levels lower than said particular priority level transmits one packet and is then disabled, and said cleaning condition changes to said normal condition after all of said registers having priority levels lower than said particular priority level are disabled.

6. The method according to claim 5 further comprising a step of counting an accumulated number of packets transmitted from said registers in said normal condition.

7. The method according to claim 6 wherein said normal condition changes to said cleaning condition when said accumulated number exceeds a threshold.

8. A device for coordinating a packet transmission order for a plurality of registers of different priority levels, comprising:

a counter electrically connected to said registers, and generating a count value corresponding to a number of packets transmitted from said registers; and a controller electrically connected to said counter and said registers, recording a particular priority level of one of said registers, from which a packet is being transmitted out in a normal condition, switching said normal condition into a cleaning condition when said count value is larger than a preset threshold, and in said cleaning condition, transmitting out one packet from and disabling each of said registers which are not empty and have priority levels lower than said particular priority level according to priority, then zeroing said count value, and returning to said normal condition after all of said registers having priority levels lower than said particular priority level are disabled.

9. The device according to claim 8 wherein said registers are a plurality of queues.

10. The device according to claim 9 wherein output ends of said queues are enabled in said normal condition.

11. The device according to claim 9 wherein output ends of said queues are disabled after transmitting out respective packets in said cleaning condition.

* * * * *